Patented Feb. 4, 1936

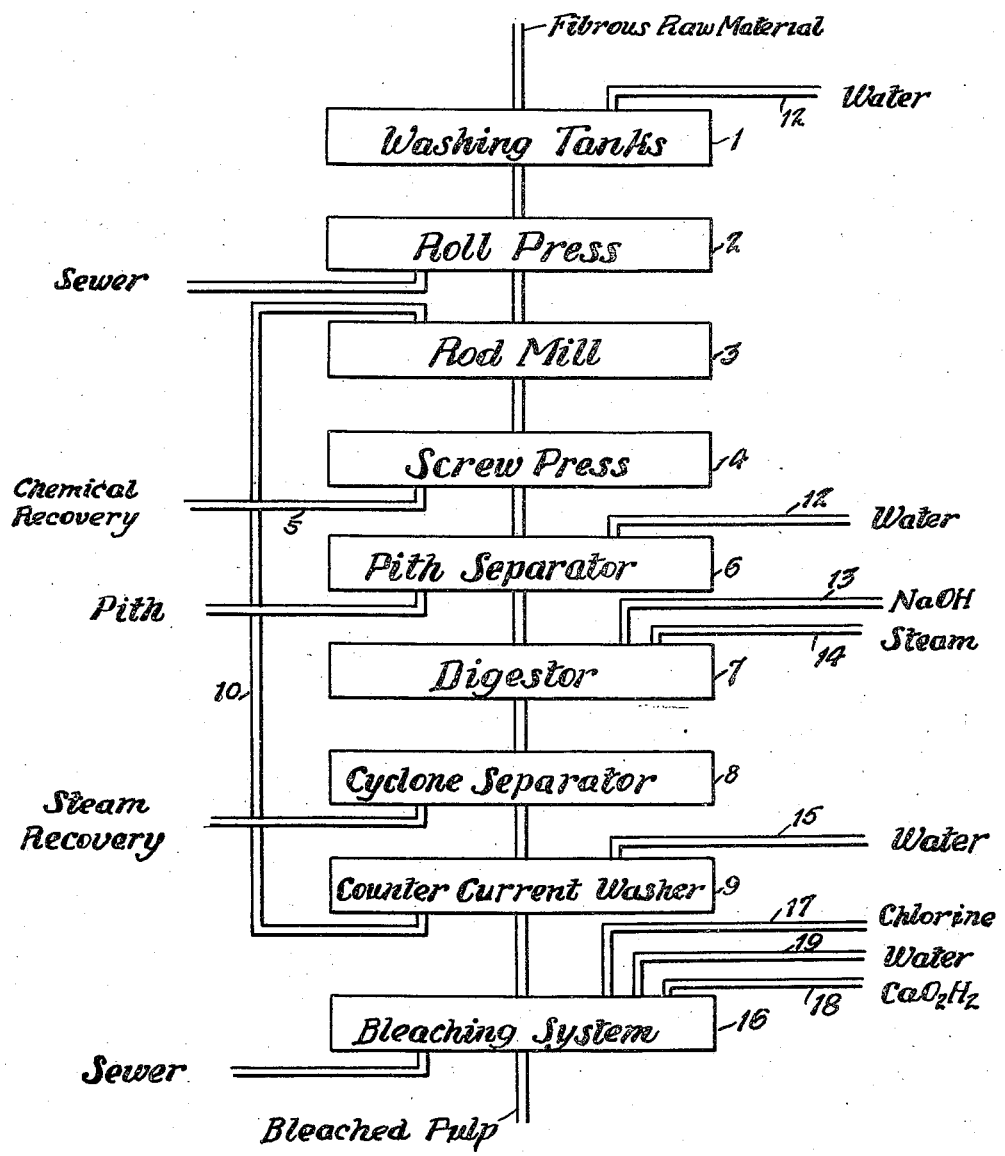

2,029,973

UNITED STATES PATENT OFFICE 2,029,973

PAPER PULP MAKING PROCESS

Sidney D. Wells, Combined Locks, Wis., assignor of one-half to Gerald D. Muggleton, Appleton, Wis.

Application August 22, 1934, Serial No. 741,010

9 Claims. (Cl. 92—6)

This invention relates generally to a method of and apparatus for producing paper pulp and is particularly advantageous when used to convert fibrous vegetable material into paper pulp.

With the present invention corn stalks, cereal straws, flax straw, bamboo, bagasse, and the stalks, stems and leaves of similar annual plants may be manufactured into paper pulp which has the felting, sheet forming and printing properties, strength and color to render it appropriate for use as tissue and light papers in general or as the paper making up mail order house catalogs, telephone directories, and the like. The invention is not, however, restricted to the utilization of such material and this is particularly true of certain features thereof, the invention being capable of advantageous use in connection with waste paper stock for the discharge or removal of printing ink or coloring matter, for the purification of waste paper stock and for treatment of partially digested wood chips, wood waste or other similar material.

In Patent 1,654,624, granted January 3, 1928 to S. D. Wells for a Process for separating vegetable fibrous material, there is disclosed the use of a rod mill for the purpose of producing paper pulp from material which has been given a preliminary mild digestion. In Patent 1,769,811, granted July 1, 1930 to S. D. Wells for Process for pulping fibrous material, paper pulp is prepared by treating the material with caustic soda and the material so treated is afterwards subjected to treatment in a rod mill at elevated temperatures for the purpose of removing or consuming all traces of the caustic soda.

Certain features of the present invention are based upon the discovery that it is possible to dispense with the preliminary digestion or soaking of the fibrous material before the treatment with the rods in the rod mill and that results at least equal to those obtained with both of the proposed prior processes may be obtained by eliminating the preliminary soaking and subjecting the fibrous material within a rod mill to the beating, pounding and rubbing action of the rods in the presence of the hot, semi-spent, lyes obtained from washing the pulp after a subsequent digestion.

The avidity of plant material for caustic soda is remarkable and the unconsumed caustic in the lyes obtained from washing the completely digested material is completely consumed in the short space of time taken in passing the material through the mill. Care is taken to conserve the heat present in the hot liquor so as to accelerate the separation of the fibrous filaments and masses of pith into ultimate fibers and cells. This end is expedited by the rapid solution of encrusting material so that, in the case of cornstalks, one quarter of the substance in the original plant material is dissolved in passage through the mill and the emerging pulp can be handled thereafter by the methods and equipment used in handling paper pulp.

In practice, the invention proposes a preliminary washing of the fibrous material to remove soil, vegetable dust and other undesirable non-fibrous foreign matter therefrom. It may then be pressed or crushed and afterwards it is fed into the rod mill wherein it is subjected to the pounding, beating and rubbing action of the rods and to the action of semi-spent lyes obtained from the subsequent more complete digestion of the material. The material is then washed to remove the completely spent lyes and in the case of cornstalks or similar pithy material, is then passed over screens to remove the pith. The fibrous portion is then completely digested with a charge of fresh cooking liquor in the usual batch type digesters or, preferably, in a continuous digester. With the large excess of cooking chemical that can be used on account of its complete utilization in the preliminary rod mill treatment it is possible to finish the digestion in twenty minutes after reaching a temperature of 175° C. and care must be taken to maintain rapid and thorough mixing while the charge is being rapidly heated to this temperature. The character of the material and the rapidity of action renders continuous digesters feasible for this step. After digestion the contents are blown into a cyclone separator where the steam is separated from the pulp and semi-spent lyes and used for heating or evaporation. The pulp is washed and the semi-spent lyes removed therefrom are used for the preliminary treatment of the stock in the rod mill. The washed pulp is then used as such or bleached by any of the conventional single or multi stage bleaching processes such as the one described in Patent No. 1,883,193, granted October 18, 1932 to S. D. Wells for bleaching of paper pulp, or that described in application Serial No. 646,588 filed December 10, 1932 by Wells and Muggleton.

It is obvious to those skilled in the art that I have described herein a procedure that is capable of continuous flow at high capacity with the most efficient use of labor, heat and chemicals and with the possible practical use of the flash steam and the efficient use of the soda as well as the other valuable constituents of the spent lyes. On account of the countercurrent nature of the process the fiber is isolated with minimum degradation of the cellulose or loss of strength and, in the case of pithy plant material, the pith may be removed from the fiber before it is subjected to complete digestion with the consequent conservation of pith material and saving in chemical.

In the drawing, the figure represents diagrammatically an apparatus which may be employed for carrying out the methods proposed by the present invention.

Referring to the drawing, it will be seen that the fibrous vegetable material is supplied in any suitable fashion to a washing tank which may consist simply of a long tank of water provided with immersing means and which functions to wash the material free from soil, vegetable dust and other undesirable non-fibrous foreign matter thereon. The material may be charged into one end of the washing tank on a suitable conveyor and discharged therefrom at the other end by the same conveyor which may be submerged in the water of the tank and which, at its discharge end, feeds the material into a pressing arrangement designated generally at 2 and which may consist of a two-roll crusher and a three-roll cane press of the type used in cane sugar mills. The dirty water expressed from the material by the pressing arrangement 2 may be run into a sewer or, if desired, may be properly treated for the recovery of the soluble carbohydrates and proteins removed from the raw material and which may be used for stock feed. Fresh water may be supplied to the washing tank to maintain the desired water level therein or, if desired, spent liquor from subsequent pressing and washing operations may be introduced into the washing tank, if this is desirable from the standpoint of economy or to avoid stream pollution. The crushed material is delivered from the pressing arrangement 2 to a rod mill 3. A hot partially spent solution of caustic soda is run into the rod mill 3 from a subsequent operation so that the crushed material is immersed therein while being subjected to the beating, pounding and rubbing action of the freely falling rods during the operation of the rod mill. This action serves to rapidly and thoroughly mix the material with the semi-spent hot lyes so that the incrusting matter is rapidly and uniformly dissolved while at the same time the fibrous filaments and shell the pithy material are resolved substantially to their ultimate fibers and cells with complete utilization of the cooking chemical and practically no solution of cellulose, pentosan, and lignin. The pulp material emerging from the rod mill 3 is conveyed in any suitable way to a screw press 4 where the water content is reduced from approximately ten parts of water to one of pulp to approximately two parts of water to one of pulp. The rod mills, screw presses and mixing conveyor used between them are preferably of the type illustrated and described more in detail in the application of Sidney D. Wells, filed June 29, 1932, Serial No. 619,863, for Apparatus for and method of removing printing ink from paper and reference is made to such application for a more detailed disclosure of these instrumentalities.

From the screw press the material when obtained from pithy, fibrous, plant material is passed over the screens to separate the pith from the fiber when such separation is desired. Otherwise the pith separation may be omitted. The fibrous semi-cooked pulp is then charged to digester 7 with an excess of caustic soda liquor from line 13 and steam from line 14. Digester 7 should be either of the revolving or tumbling type or preferably, it should be provided with positive stirring devices so as to insure the rapid, uniform, and intimate mixing of the fiber, chemical solution and steam. After the solution of substantially all of the lignin, hemi-celluloses and most of the resolvable pentosans the contents of digester 7 are blown into separator 8 to remove and recover the flash steam. The fiber and semi-spent lyes are then washed in counter current washer 9 to render the fiber suitable for use as such or for subsequent bleaching and to supply the hot semi-spent lyes for passage through line 10 to rod mill 3.

The material is bleached in bleaching system 16 by the customary use of chlorine supplied through line 17, hydrated lime through line 18 and water through line 19.

While I have shown and described typical methods of carrying out my invention it is to be understood that the examples selected are merely for the purposes of illustration and that various changes, which will readily suggest themselves to those skilled in the art, may be made without departing from the spirit of the invention or the scope of the subjoined claims.

The invention claimed is:

1. The hereindescribed method of producing paper pulp which consists in feeding a continuous stream of the material into a rod mill, immersing the material in partially spent, hot, cooking lyes from a subsequent digestion step, separation of the fibrous and cellular elements by the beating, pounding and rubbing action of the freely falling rods within the rotating drum of the mill, discharging the pulp material from the mill continuously, removal of the substantially completely spent lyes therefrom, treatment of the material to digestion at elevated temperature with cooking lyes containing an excess of cooking chemical and removal of the partially spent lyes from the completely pulped material for use in the preliminary treatment of the raw fibrous material in the rod mill.

2. The preliminary pulping of fibrous material at low pressure by thoroughly and actively mixing and mechanically disintegrating the material while it is immersed in partially spent lyes obtained from the final digestion of the material at higher temperature in the presence of cooking lyes containing an excess of active chemical.

3. The preliminary pulping of fibrous pithy material at low pressure by thoroughly and actively mixing and mechanically disintegrating the material while it is immersed in partially spent lyes obtained from the final digestion of the material at higher temperature in the presence of cooking lyes containing an excess of active chemical, the washing of the material free from spent lyes, the reduction of the pith content of such material and the final digestion at elevated temperature of the fibrous and more resistant portion in the presence of cooking lyes containing an excess of active chemical.

4. The preliminary pulping of fibrous material at atmospheric pressure by thoroughly and actively mixing and mechanically disintegrating the material while it is immersed in hot partially spent lyes obtained from the subsequent digestion of the material at more elevated temperature in the presence of cooking lyes containing a substantial excess of active chemical, the washing of the material free from spent lyes and the digestion of the material at more elevated temperature in the presence of cooking lyes containing a substantial excess of active chemical.

5. The combination of active mixing and preliminary pulping of fibrous material at low pressure with active mixing and mechanical disintegration followed by removal from the fibrous constituents of substances loosened and dissolved thereby and more complete digestion of the fibrous portion of the material at more elevated temperature.

6. The method of treating fibrous material which comprises actively mixing and mechanically disintegrating the material in the presence of partially spent cooking liquor at an elevated temperature, removing the cooking liquor and the substances loosened and dissolved thereby, and completely digesting the fibrous constituents of the material at a more elevated temperature and in the presence of fresh cooking liquor.

7. The method of treating fibrous material which comprises actively mixing and mechanically disintegrating the material while immersed in partially spent cooking lyes obtained from the final digestion of the material, removing the spent cooking lyes and the substances dissolved and loosened thereby from the fibrous constituents of the material, treating the fibrous constituents of the material to digestion at an elevated temperature with cooking lyes containing an excess of cooking chemical, and removing the partially spent lyes from the completely pulped material for use in the mechanical disintegrating treatment of the raw fibrous material.

8. The method of pulping fibrous material which comprises mechanically disintegrating the fibrous material in the presence of hot cooking liquor at a temperature below the temperature at which the non-fibrous constituents of the material will be substantially caramelized and discolored, removing the cooking liquor and non-fibrous constituents of the material loosened and dissolved thereby, and subjecting the fibrous constituents of the material to a complete chemical digestion at an elevated temperature.

9. The method of treating fibrous material which comprises mechanically disintegrating the material in a rod mill in the presence of hot cooking chemicals, removing the cooking liquor and non-fibrous material dissolved and loosened thereby, and completing the digestion of the fibrous portion of the material at a more elevated temperature and in the presence of fresh cooking chemicals.

SIDNEY D. WELLS.